(12) United States Patent
Sundararajan

(10) Patent No.: US 9,754,593 B2
(45) Date of Patent: Sep. 5, 2017

(54) SOUND ENVELOPE DECONSTRUCTION TO IDENTIFY WORDS AND SPEAKERS IN CONTINUOUS SPEECH

(71) Applicant: International Business Machines Corporation, Armonk, NY (US)

(72) Inventor: Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/931,943

(22) Filed: Nov. 4, 2015

(65) Prior Publication Data

US 2017/0125024 A1 May 4, 2017

(51) Int. Cl.
*G10L 17/02* (2013.01)
*G10L 19/00* (2013.01)
*G10L 15/30* (2013.01)
*G10L 25/15* (2013.01)

(52) U.S. Cl.
CPC .......... *G10L 19/0018* (2013.01); *G10L 15/30* (2013.01); *G10L 17/02* (2013.01); *G10L 25/15* (2013.01)

(58) Field of Classification Search
CPC ......... G10L 17/02; G10L 17/00; G10L 17/06; G10L 17/08; G10L 17/14; G10L 17/22; G10L 17/26
USPC .......................... 704/244, 246, 247, 248, 250
See application file for complete search history.

(56) References Cited

U.S. PATENT DOCUMENTS

| 8,442,831 | B2 | 5/2013 | Sundararajan | |
|---|---|---|---|---|
| 8,543,402 | B1* | 9/2013 | Ma | G10L 17/04 704/243 |
| 8,620,657 | B2 | 12/2013 | Farrell et al. | |
| 9,368,109 | B2* | 6/2016 | Colibro | G10L 15/063 |
| 2004/0083104 | A1* | 4/2004 | Liu | G10L 15/28 704/245 |
| 2007/0198262 | A1 | 8/2007 | Mindlin et al. | |

(Continued)

FOREIGN PATENT DOCUMENTS

WO 2014153800 A1 10/2014

OTHER PUBLICATIONS

"Microsoft Contextual Ads for Video Demo", Youtube video retrieved from https://www.youtube.com/watch?v=Ev3gVqxVoTI; Feb. 2008.

(Continued)

*Primary Examiner* — Qi Han
(74) *Attorney, Agent, or Firm* — Brown & Michaels, PC; Maeve L. McCarthy

(57) ABSTRACT

A speech recognition capability in which speakers of spoken text are identified based on the contour of sound waves representing the spoken text. Variations in the contour of the sound waves are identified, features are assigned to those variations, and parameters of those features are grouped into predefined characteristics. The predefined characteristics are combined into voice characteristic groups. If a prior voice characteristic group is present, the voice characteristic group from the soundlet is compared to existing voice characteristic groups and, if a match is present, the sound construct is assigned to a speaker identified by the existing voice characteristic group.

17 Claims, 19 Drawing Sheets

(56) References Cited

U.S. PATENT DOCUMENTS

2010/0114576 A1* 5/2010 Sundararajan .......... G10L 15/02
                                                                                         704/253

OTHER PUBLICATIONS

Okuno et al. "A New Speech Enhancement :Speech Stream Segregation", 10 International Conference on Spoken Language Processing; Jan. 1998.

* cited by examiner

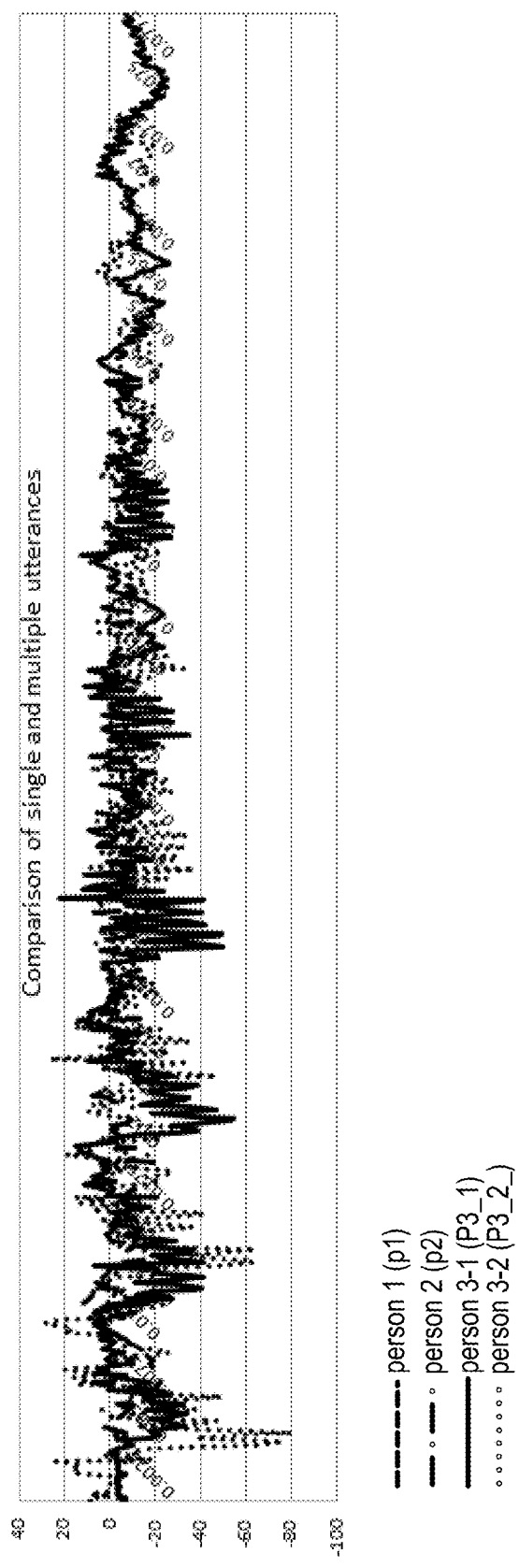

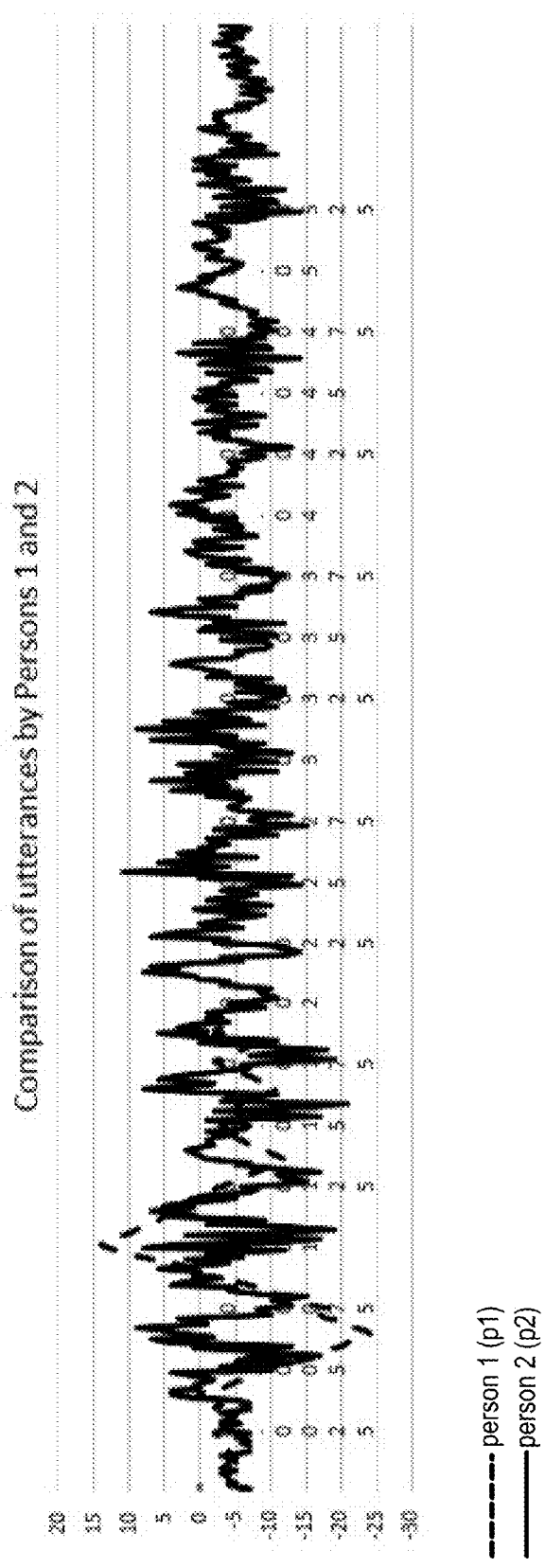

SOUND ENVELOPE DECONSTRUCTION TO IDENTIFY WORDS AND SPEAKERS IN CONTINUOUS SPEECH

BACKGROUND

The present invention relates to speech recognition, and more specifically to facilitating the identification of spoken words and individual speakers in continuous speech via deconstruction of the sound envelope representing those spoken words.

Speech recognition enables users to interact with devices using spoken words. There are many technologies today that enable speech recognition. Some of the current technologies include techniques that predominantly analyze the speech spectrograms.

In one approach, a window (e.g., Hamming window, etc.) of 20 to 50 milliseconds (cepstral extraction) is applied, and then the spectrum of the captured waveform is measured and compared against the spectrum samples in a library of sounds. The comparison finds distances for the set of features and the feature with the minimum distance is selected.

Additionally, the currently known solutions require training of the tool by the speakers to supplement the pre-training from the corpus. Several HMM's (Hidden Markov Models) are set up to help with the identification of words represented by the sounds. Sometimes, statistical language models, semantic interpretation and acoustic models, such as phoneme based models, are also used to help identify the spoken word. Alternatively, some models compare the spoken word against a very large corpus of words.

SUMMARY

According to one embodiment of the present invention, a method of identifying at least one speaker from a speech segment obtained by a computer is disclosed. One or more words of the speech segment are determined by identifying one or more portions of a sound wave having a sound wave contour between silences. The method comprising the steps of: the computer analyzing the sound wave contour of at least a portion of the sound wave to determine one or more variations within the sound wave contour; the computer assigning one or more features to the one or more variations; the computer mapping one or more assigned features to one or more sound constructs, wherein the one or more sound constructs are at least part of the word; the computer determining parameters of the assigned features; the computer grouping the parameters into predefined characteristics; the computer combining the predefined characteristics into a voice characteristic group for a single speaker; and if a prior voice characteristic group is present, the computer comparing the voice characteristic group to existing voice characteristic groups and, if a match is present, the computer assigning the sound construct to a speaker identified by the existing voice characteristic group.

According to another embodiment of the present invention, a computer program product for identifying at least one speaker from a speech segment obtained by a computer is disclosed. One or more words of the speech segment are determined by identifying one or more portions of a sound wave having a sound wave contour between silences. The computer comprises at least one processor, one or more memories, one or more computer readable storage media and the computer program product comprises a computer readable storage medium having program instructions embodied therewith. The program instructions executable by the computer to perform a method comprising: analyzing, by the computer, the sound wave contour of at least a portion of the sound wave to determine one or more variations within the sound wave contour; assigning, by the computer, one or more features to the one or more variations; mapping, by the computer, one or more assigned features to one or more sound constructs, wherein the one or more sound constructs are at least part of the word; determining, by the computer, parameters of the assigned features; grouping, by the computer, the parameters into predefined characteristics; combining, by the computer, the predefined characteristics into a voice characteristic group for a single speaker; and if a prior voice characteristic group is present, comparing, by the computer, the voice characteristic group to existing voice characteristic groups and, if a match is present, assigning, by the computer, the sound construct to a speaker identified by the existing voice characteristic group.

According to another embodiment of the present invention, a computer system for identifying at least one speaker from a speech segment obtained by a computer is disclosed. One or more words of the speech segment are determined by identifying one or more portions of a sound wave having a sound wave contour between silences. The computer comprising at least one processor, one or more memories, one or more computer readable storage media having program instructions executable by the computer to perform the program instructions. The program instructions comprising: analyzing, by the computer, the sound wave contour of at least a portion of the sound wave to determine one or more variations within the sound wave contour; assigning, by the computer, one or more features to the one or more variations; mapping, by the computer, one or more assigned features to one or more sound constructs, wherein the one or more sound constructs are at least part of the word; determining, by the computer, parameters of the assigned features; grouping, by the computer, the parameters into predefined characteristics; combining, by the computer, the predefined characteristics into a voice characteristic group for a single speaker; and if a prior voice characteristic group is present, comparing, by the computer, the voice characteristic group to existing voice characteristic groups and, if a match is present, assigning, by the computer, the sound construct to a speaker identified by the existing voice characteristic group.

BRIEF DESCRIPTION OF THE DRAWINGS

FIG. 5 shows a graph comparing single and multiple utterances of three people for the word "take".

FIG. 6 shows a graph of comparison of utterances by a first person and a second person for the word "take".

DETAILED DESCRIPTION

Figure 1:
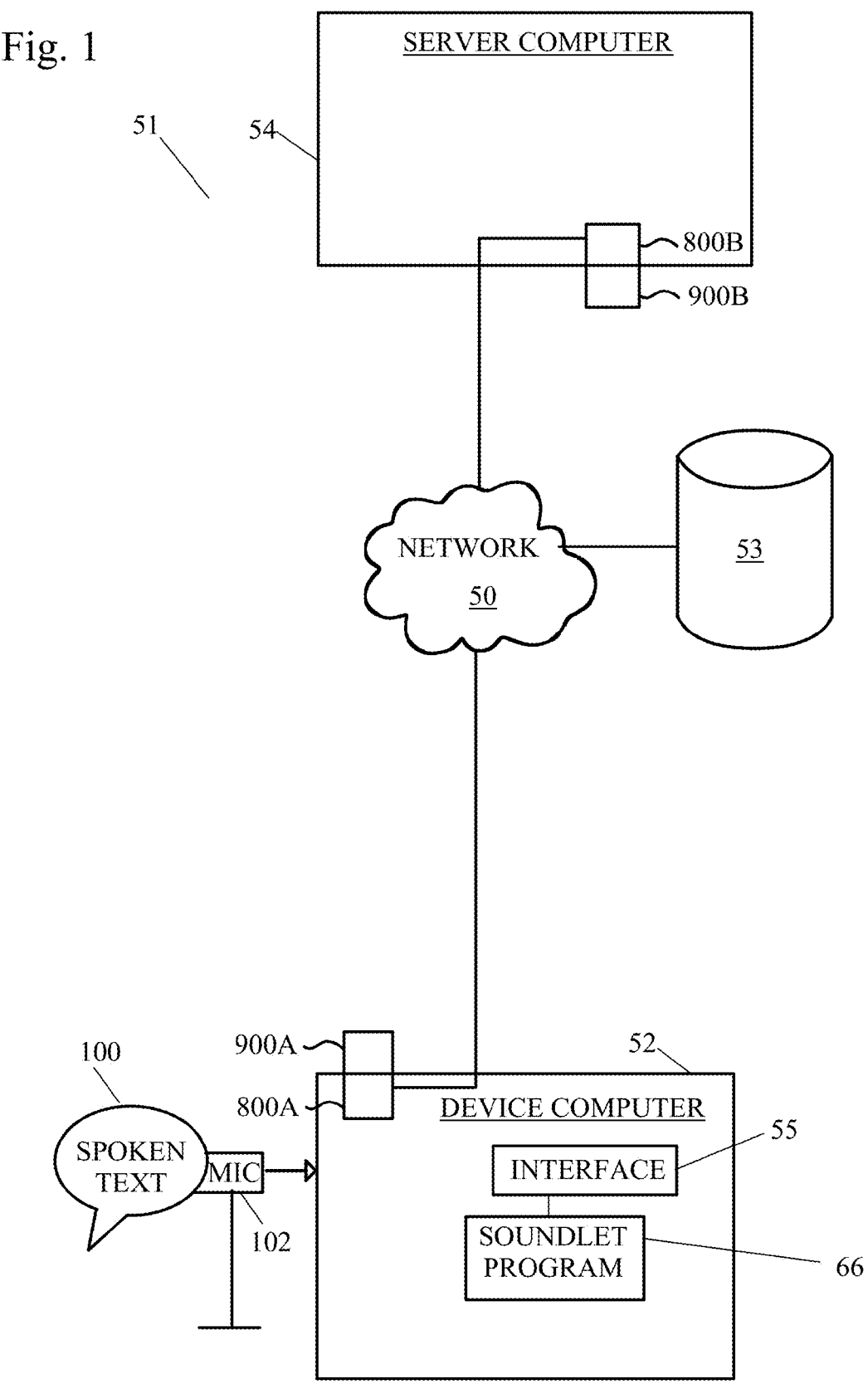
FIG. 1 depicts an exemplary diagram of a possible data processing environment in which illustrative embodiments may be implemented.

FIG. 1 is an exemplary diagram of a possible data processing environment in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wires, wireless communication links, or fiber optic cables.

In the depicted example, a device computer 52, a repository 53, and a server computer 54 connect to network 50. In other exemplary embodiments, network data processing system 51 may include additional client or device computers, storage devices or repositories, server computers, and other devices not shown.

Figure 8:
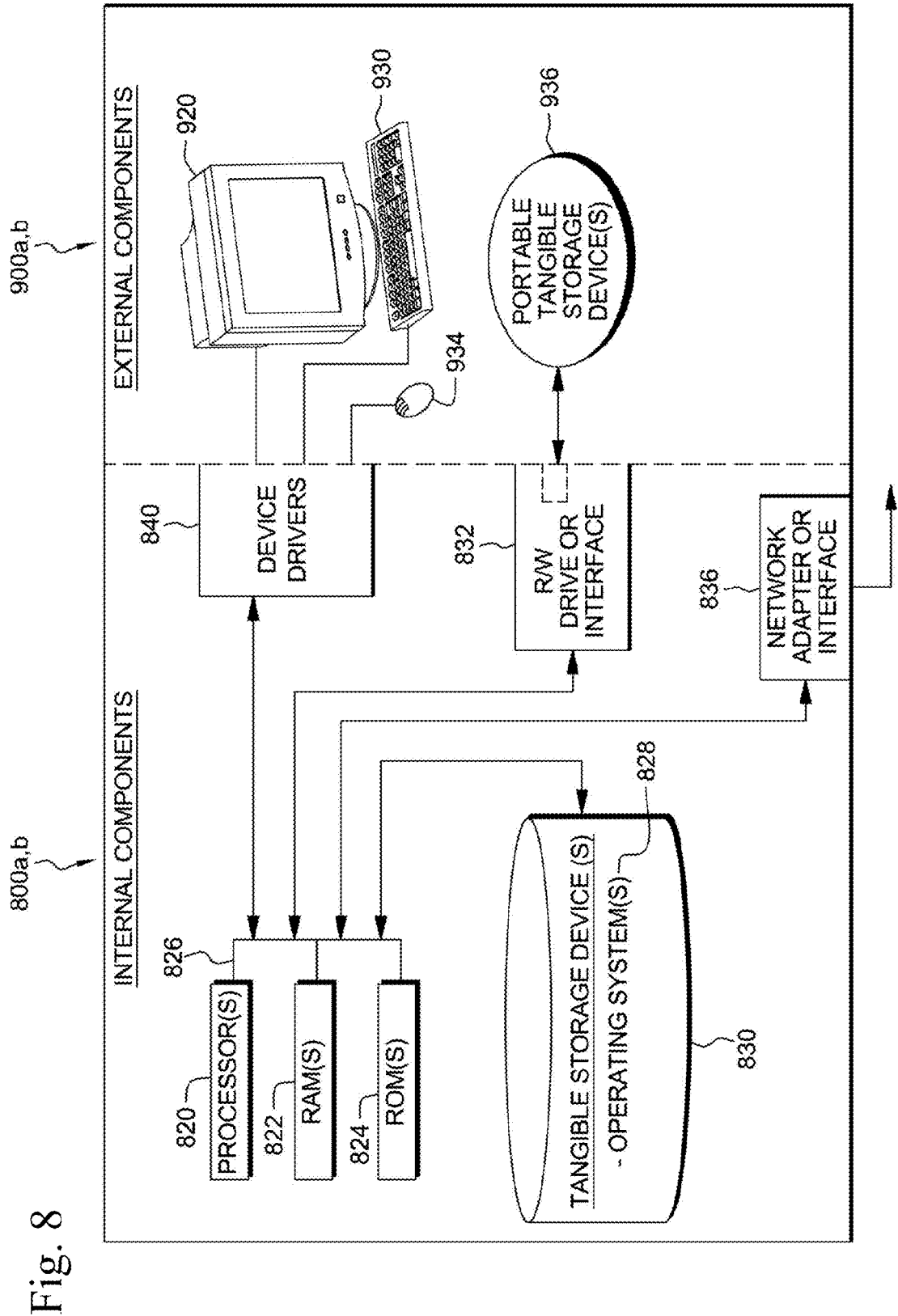
FIG. 8 illustrates internal and external components of a client or device computer and a server computer in which illustrative embodiments may be implemented.

Device computer 52 includes a set of internal components 800a and a set of external components 900a, further illustrated in FIG. 8. Device computer 52 may be, for example, a mobile device, a cell phone, a smart phone, a personal digital assistant, a netbook, a laptop computer, a tablet computer, a desktop computer, or any other type of computing device.

The device computer 52 preferably has a means for listening and recording audio files through a microphone 102. The device computer 52 may have an interface 55 which may accept commands and data entry from a user such as spoken text 100. The interface may be, for example, a command line interface, a graphical user interface (GUI), or a web user interface (WUI) through which a user can access spoken text.

Server computer 54 includes a set of internal components 800b and a set of external components 900b illustrated in FIG. 8. In the depicted example, server computer 54 provides information, such as boot files, operating system images, and applications to device computer 52. Server computer 54 can compute the information locally or extract the information from other computers on network 50.

Program code and programs such as a soundlet program 66 may be stored on at least one of one or more computer-readable tangible storage devices 830 shown in FIG. 8, on at least one of one or more portable computer-readable tangible storage devices 936 as shown in FIG. 8, on repository 53 connected to network 50, or downloaded to a data processing system or other device for use. For example, program code and programs such as the soundlet program 66 may be stored on at least one of one or more tangible storage devices 830 on server computer 54 and downloaded to the device computer 52. The soundlet or waveforms may be stored on the device computer or in repository 53.

Alternatively, server computer 54 can be a web server, and the program code and programs such as the soundlet program 66 may be stored on at least one of the one or more tangible storage devices 830 on server computer 54 and accessed on the device computer 52. In other exemplary embodiments, the program code and programs such as the soundlet program 66 may be stored on at least one of one or more computer-readable tangible storage devices 830 on server computer 54 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

In accordance with an aspect of the present invention, a speech recognition capability is provided in which words are identified in a speech segment based on the contour of sound waves representing the spoken words of that speech segment. For example, variations in the contour of the sound waves of the speech segment are identified, features are assigned to those variations, and then the features are mapped to sound constructs (e.g., consonants and vowels) for recognition of words within the speech segment. Based on the sound constructs, individual speakers can be recognized. Sound constructs is herein defined as a sound contour segment (part of the sound wave) with one or more features that form a part of or the whole word—typically mapping to one of more syllables or alphabets of the word.

Figure 2:
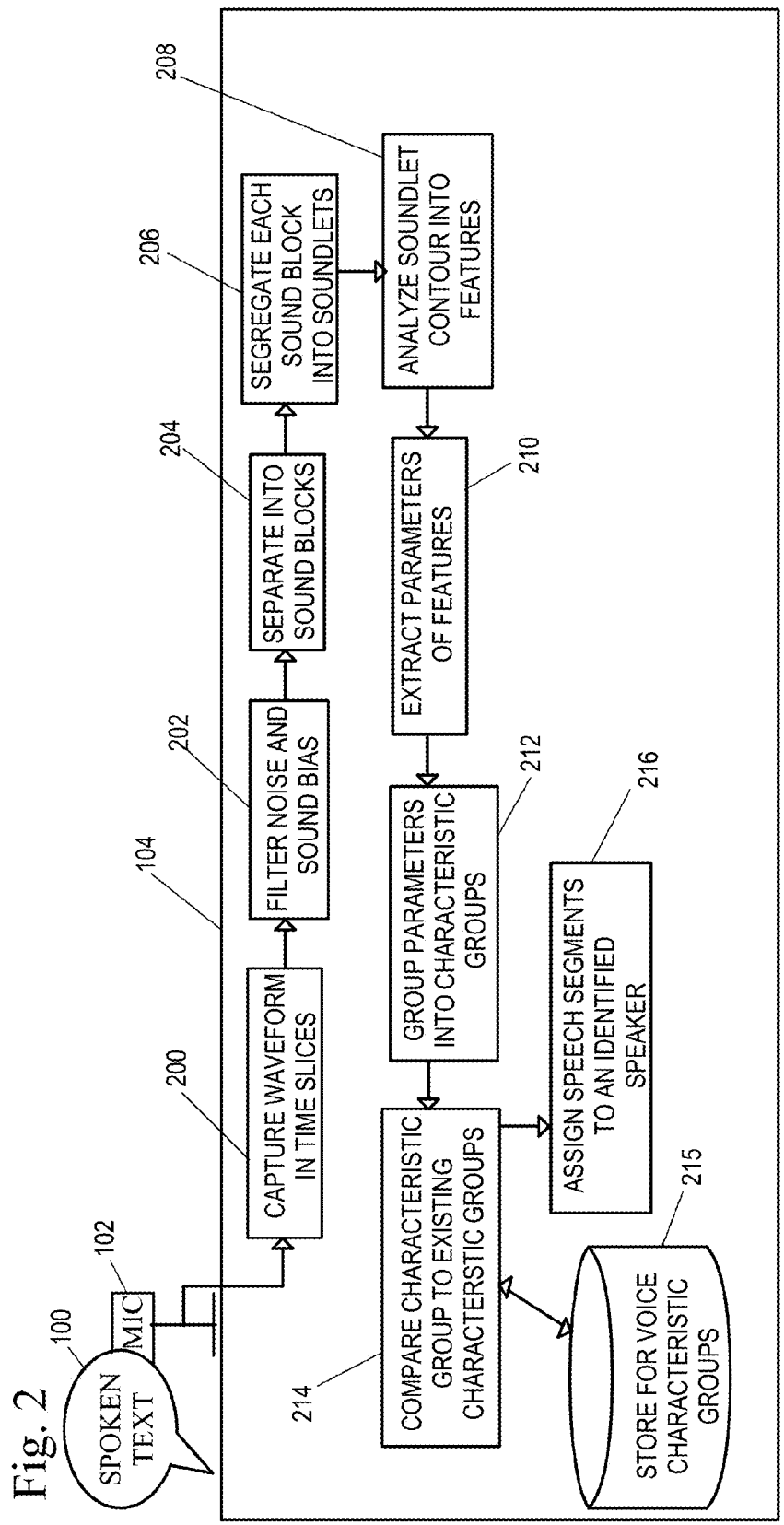
FIG. 2 shows an example of processing to be performed to recognize speech, in accordance with an aspect of the present invention.

One embodiment of an environment to incorporate and use one or more aspects of the present invention is described with reference to FIGS. 1 and 2. As shown in FIGS. 1 and 2, spoken text 100 is input into a microphone 102 by, for instance, a user speaking into the microphone. The microphone can be any off-the-shelf basic microphone or any other microphone with advanced acoustic capabilities. The microphone is coupled to a device 52, 104, which can be one of various devices including, but not limited to, any type of computing device (e.g., a computer), a computing component (e.g., a circuit), a cell phone, or any other type of device that can accept speech. In one example, the device includes storage 53 or the device may be coupled to a repository 215 for storing voice characteristics groups. The device may or may not include a display. The device 104 may also be coupled to a device computer 52.

The device 52, 104 receives the spoken text as sound waveforms and analyzes the contour of the sound waveforms. The analysis identifies variations in the waveforms, and assigns features to the variations. The features are used to identify sound constructs (e.g., consonants and vowels) of the spoken text as well as individual speakers. Therefrom, words are formed. This processing is further described with reference to FIG. 2 and FIGS. 3A-3D. In particular, a general overview of the process is described with reference to FIG. 2, and further details are discussed with reference to FIGS. 3A-3D.

Referring to FIG. 2, spoken text 100 is transmitted via microphone 102 to device 104. Device 104 captures the waveform of the spoken text in time slices, STEP 200. As an example, each time slice is x (e.g., 10) seconds long. Thus, the spoken text is captured at 10 second intervals. Although 10 seconds is used, any other desired time may be used.

The device then filters the noise and sound bias, STEP 202. There are existing techniques to filter noise, including low pass Bessels filters. To filter the sound bias, as is known, a shift is performed to return to zero.

The captured waveform is then separated into sound blocks (e.g., words), STEP 204, and each sound block is segregated into one or more soundlets based on, for instance, periods of silence observed in the captured waveform, STEP 206. The term soundlet, as used herein is defined as is a portion of the sound wave between silences where the waveform shows non-monotonic contour variations. These variations are analyzed to verify if any features as defined are found.

For each soundlet, the contour of the waveform for that soundlet is analyzed, providing one or more features, STEP 208. Parameters of the features are extracted, STEP 210, and grouped into characteristic groups, STEP 212. The characteristic groups are compared to existing characteristic groups, STEP 214, from a repository 215 and speech segments are assigned to an identified characteristic group, STEP 216. The voice characteristic group (VCG) may be any sound characteristics that aid identifying different speakers and may be defined as:

VCG={{ characteristics of vowel sub-group}, {characteristics of non-vowel sub-group}}

Further details regarding the logic for continuous speech recognition, and in particular, the sound envelope deconstruction approach of one or more aspects of the present invention, are described with reference to FIGS. 3A-3D. Further, reference is also made to the diagrams of FIGS. 4A-4I.

Figure 3A:
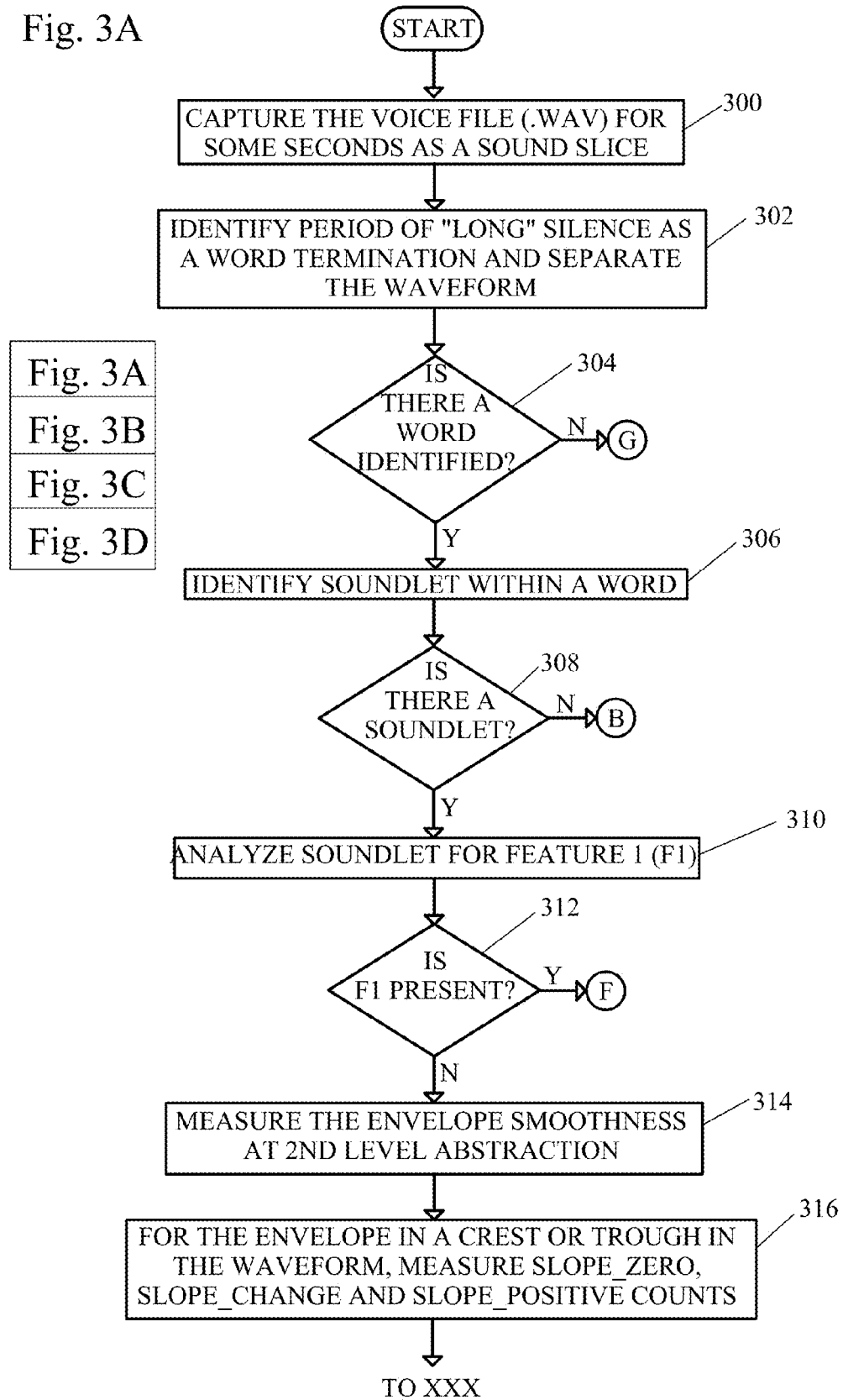
FIGS. 3A-3D show a flow diagram of a method of recognizing speech identifying individual speakers, in accordance with an aspect of the present invention.
Figure 3B:
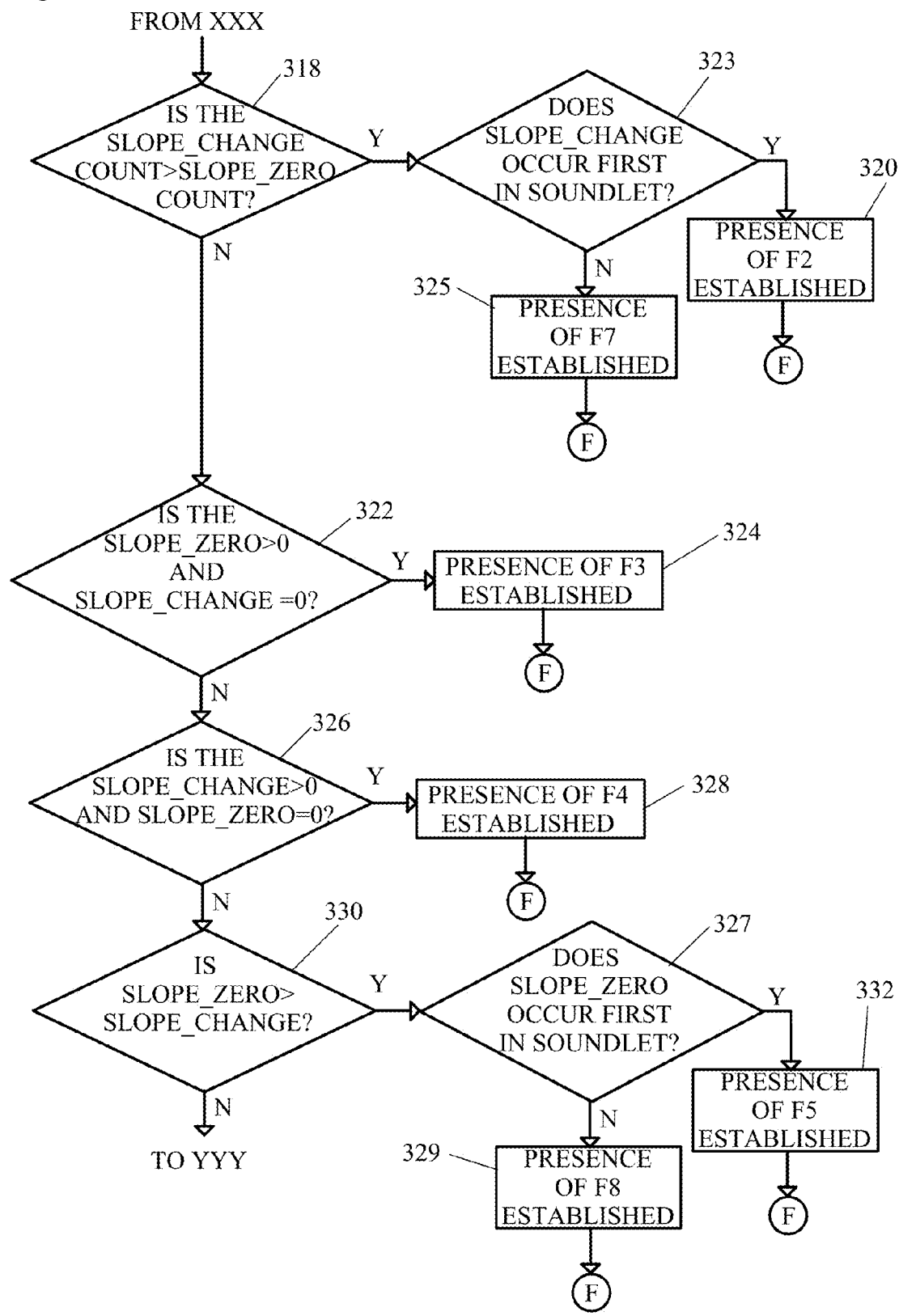

Referring initially to FIG. 3A, a voice file is captured for a desired number of seconds (e.g., 10 seconds), STEP 300. In particular, the sound waves are captured from the microphone and saved in the computer as a wave file (.wav), which is an audio file. Other forms of audio files can also be similarly processed. As described with reference to FIG. 2, the captured waveform is filtered and rendered for further processing.

Thereafter, the time slice is separated into one or more sound blocks (e.g., words). This is accomplished by identifying periods of "long" silence, which indicate word terminations, STEP 302. In particular, the waveform is analyzed to identify both the positive and negative variations of the waveform. A period of silence is looked for in which the waveform is close to zero. In this particular example, 100 or 200 milliseconds of silence (i.e., zero or close to zero waveform) indicates a word termination. Although 100 or 200 milliseconds is used in this example, other amounts of time may be used.

If a word is identified, INQUIRY 304, then a soundlet within the word is identified, STEP 306. For example, the waveform is analyzed for 40 to 80 milliseconds of near zero value (in other examples, other amounts of time may be used). If there is 40-80 milliseconds of near zero value in the word waveform, as an example, then a soundlet is present. A word is composed of one or more soundlets.

Figure 4A:
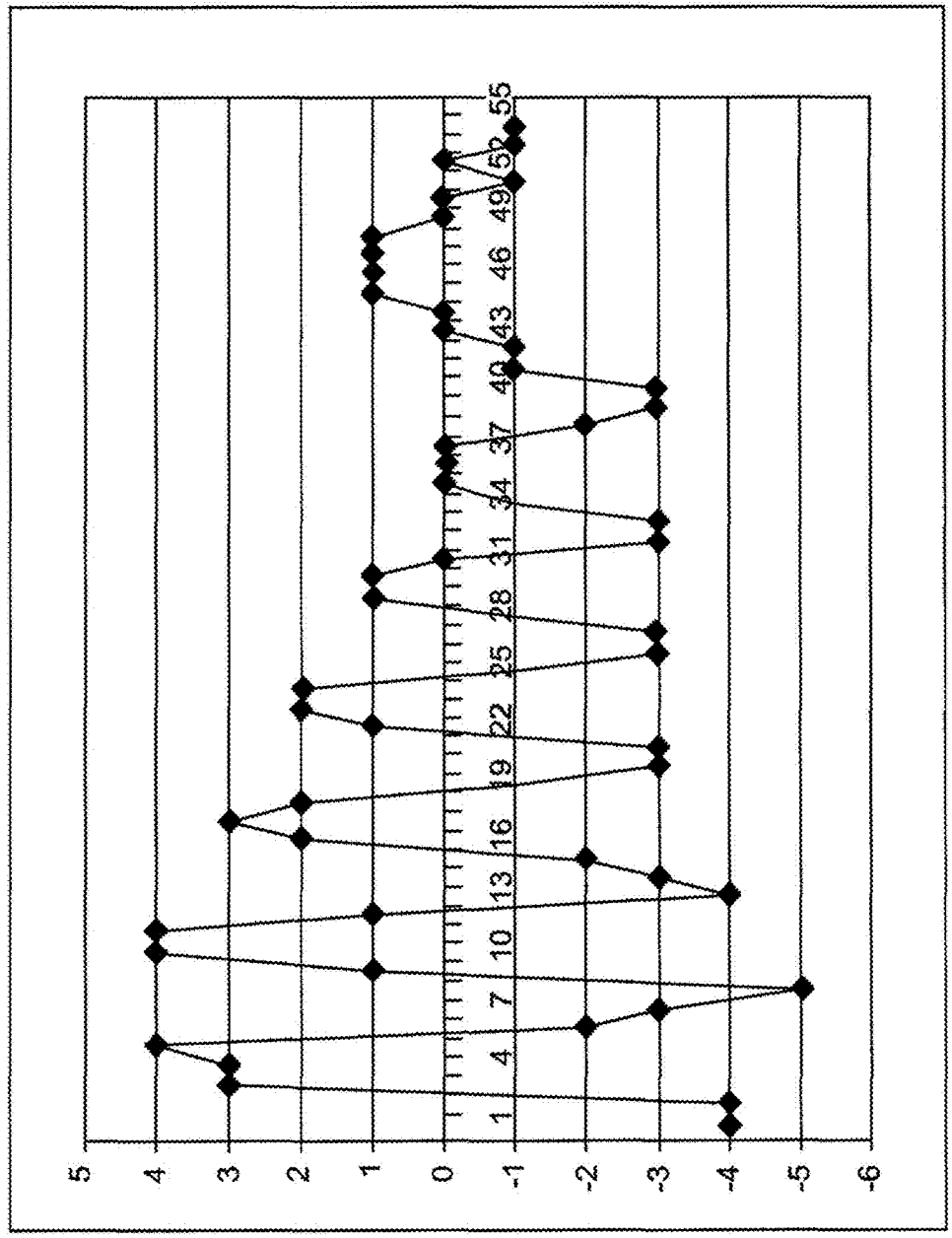
FIGS. 4A-4F and 4H-4I depict example waveforms of eight features, respectively, used to determine spoken sound constructs, in accordance with an aspect of the invention.

If a soundlet is found, INQUIRY 308, then the soundlet is analyzed to determine if it includes one or more specified features (e.g., Features 1-8), described below. In particular, in one example, the contour of the waveform representing the soundlet is analyzed to determine if Feature 1 (F1) is present STEP 310. In one example, Feature 1 (referred to as a sound whorl) is derived by analyzing the sound contour over a period when it varies across the central value (e.g., zero), as depicted in FIG. 4A. Feature 1 is identified as being present when the envelope of the waveform varies rapidly (e.g., <5 msec period for a crest or trough) at least, for instance, five times between negative and positive regions around the zero value. As used herein, a crest is the envelope waveform in the positive region and the trough is the envelope waveform in the negative region.

If Feature 1 is present, INQUIRY 312, then processing continues at STEP 338 (FIG. 3C), as described below. However, if Feature 1 is not present, INQUIRY 312 (FIG. 3A), then processing continues to establish whether a presence of one or more of features F2-F8 is present as discussed with reference to steps 314-336 of FIGS. 3A, 3B and 3C. Each of the features (F2 . . . F8) is derived from analyzing the contour of the wave in the crest and trough durations (in the positive and negative half-waves).

For features F2 . . . F8, the following definitions are applicable: 1. Slope(m)=(val(n)+val(n+2))−2*(val(n+1))— where val is the val at an instance and n is a sample point in the wave. A wave can have 90-100 sample points, in one example. This is applied to compute the slope of the envelope when it is not monotonically changing. 2. Val=slope(m)*slope(m−1).

If val is negative, then it is counted as a slope_change.
If val is zero, then it is counted as slope_zero.
If val is positive, then it is counted as slope_positive.

Thus, if F1 is not present, processing continues with measuring the envelope smoothness at a second level of abstraction, STEP 314. This includes calculating the slope of the contour of the waveform. If the slope is 0, the envelope is smooth. Further, for a crest or trough in the waveform, slope_zero, slope_change and slope_positive counts are measured, STEP 316.

Figure 4B:
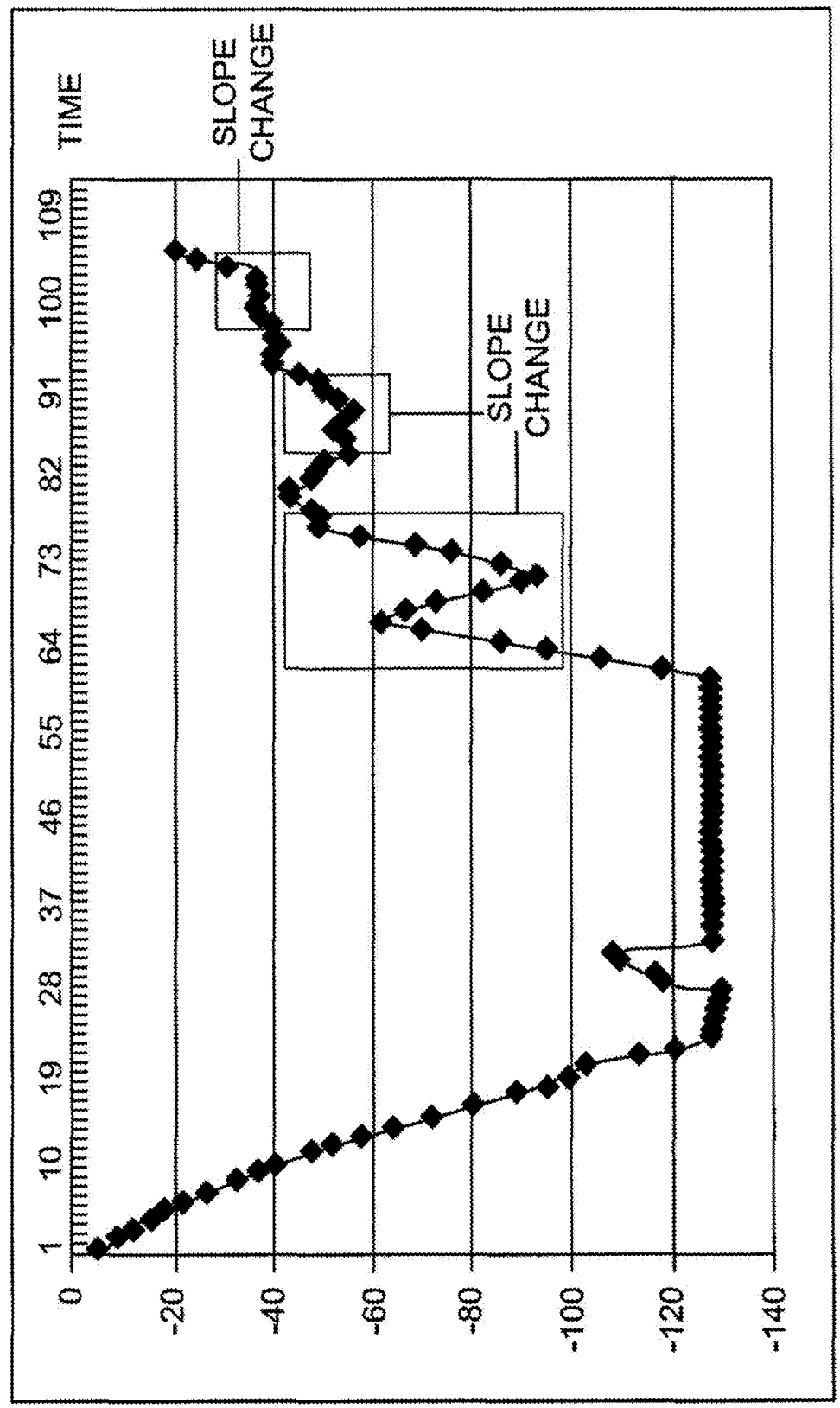
Figure 4C:
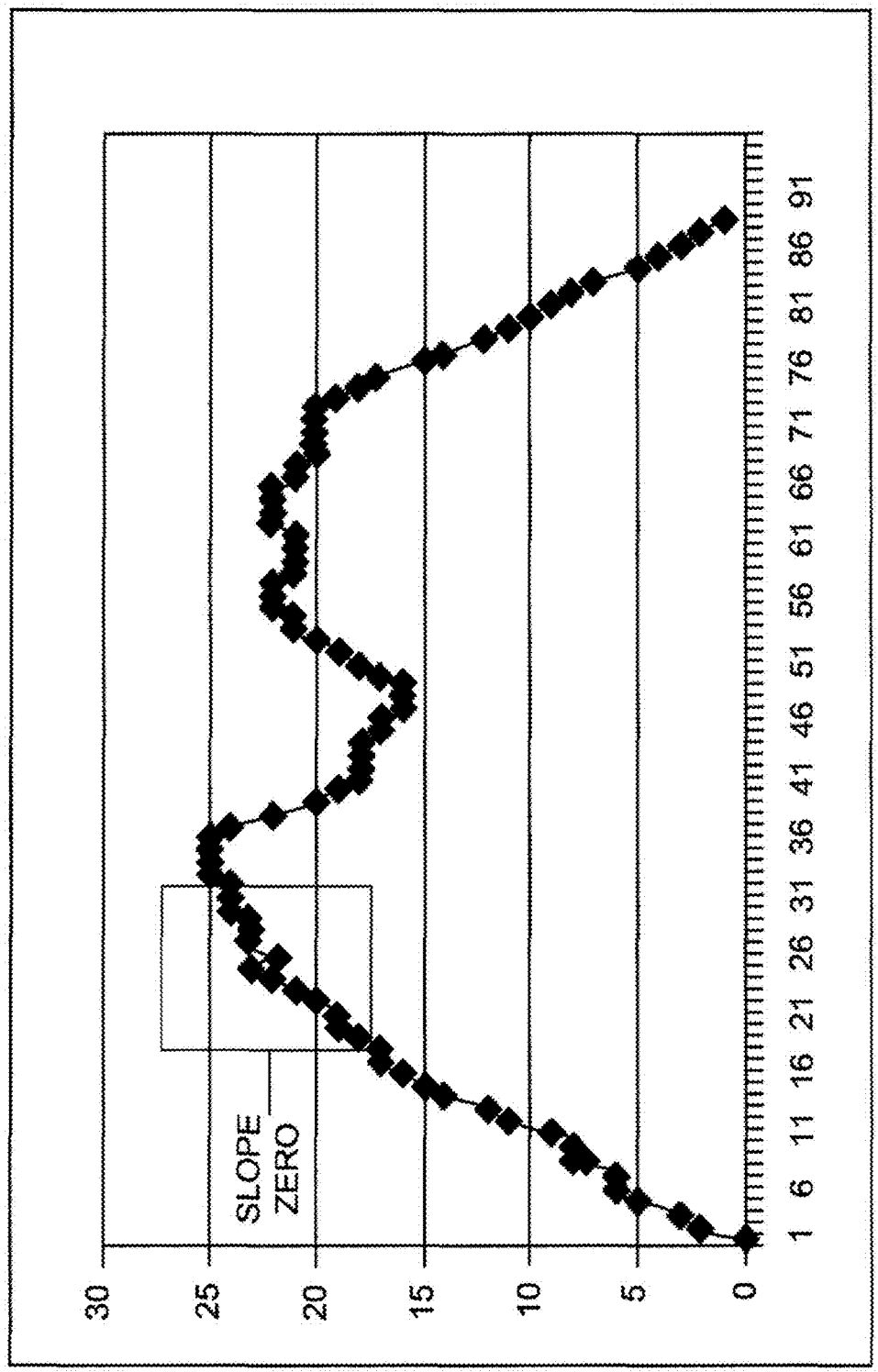
Figure 4D:
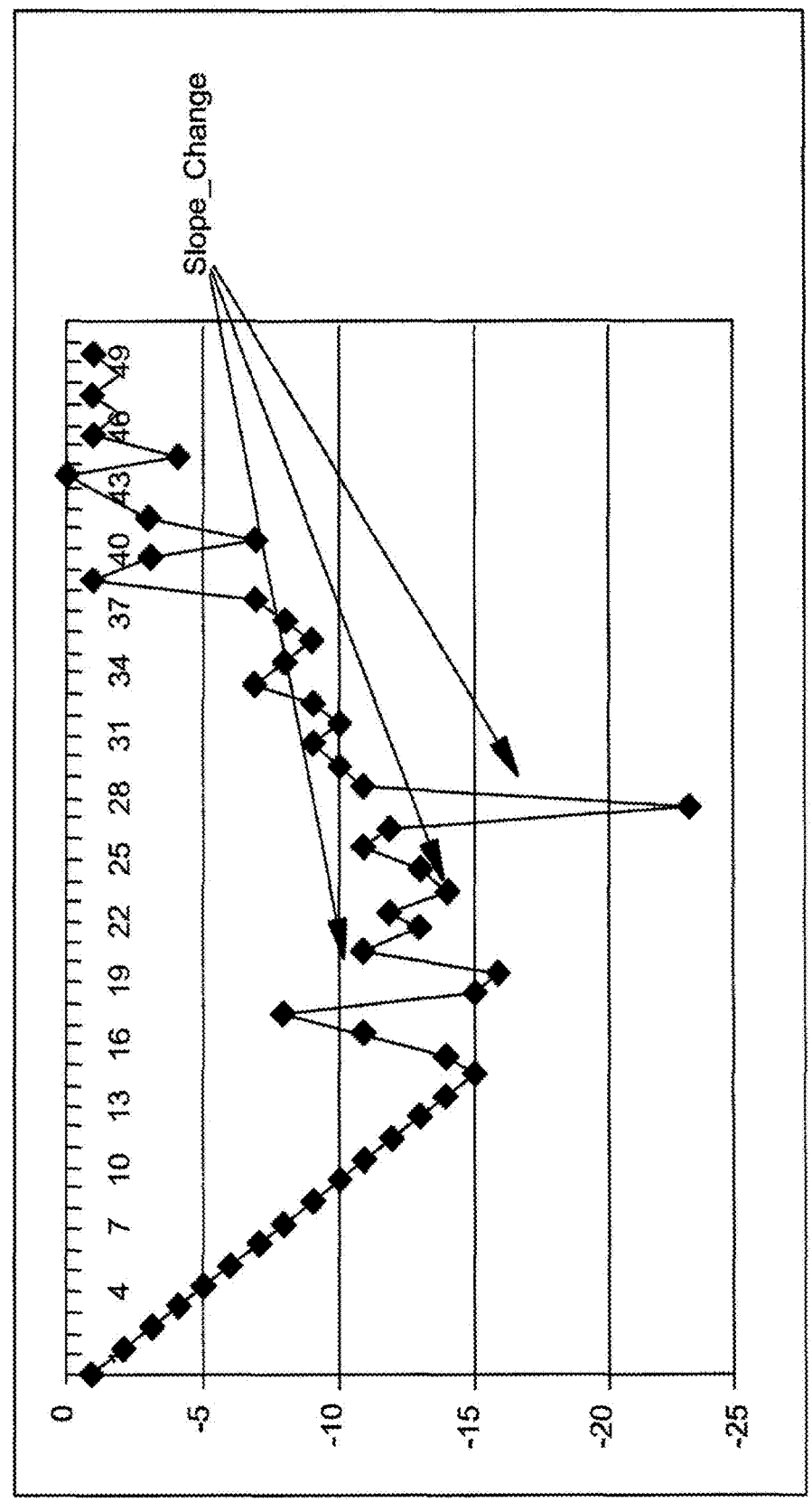
Figure 4E:
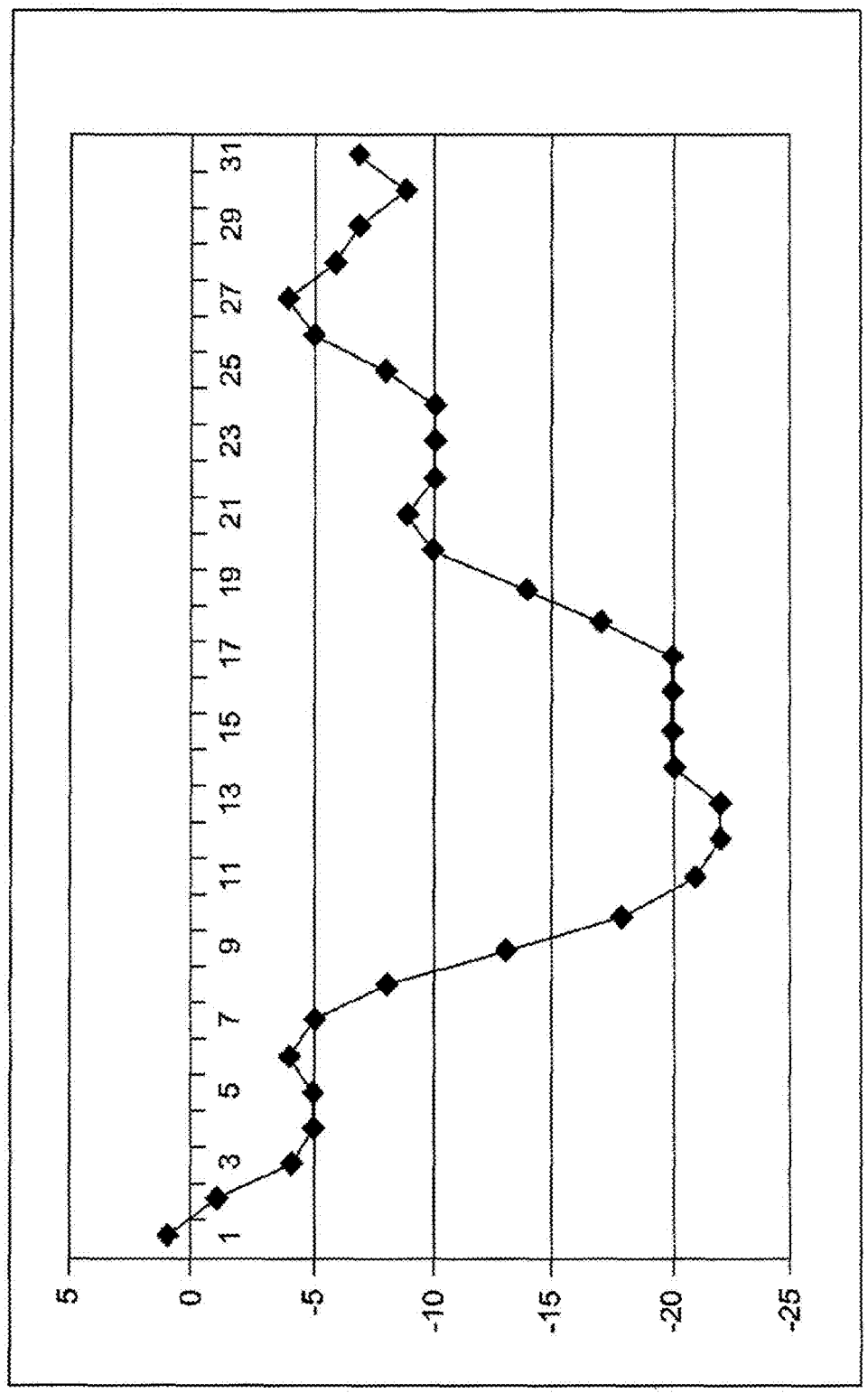
Figure 4F:
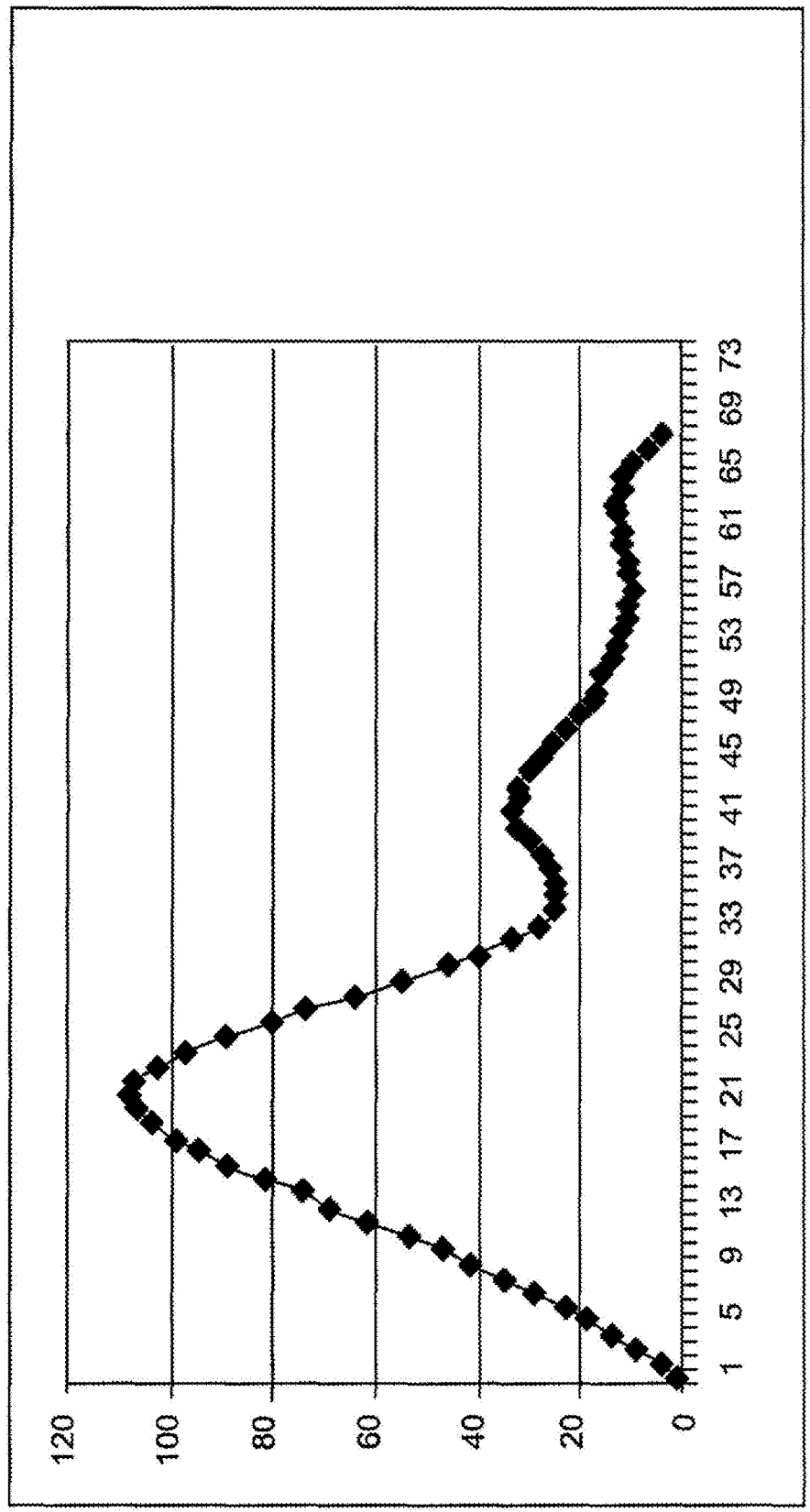
Figure 4G:
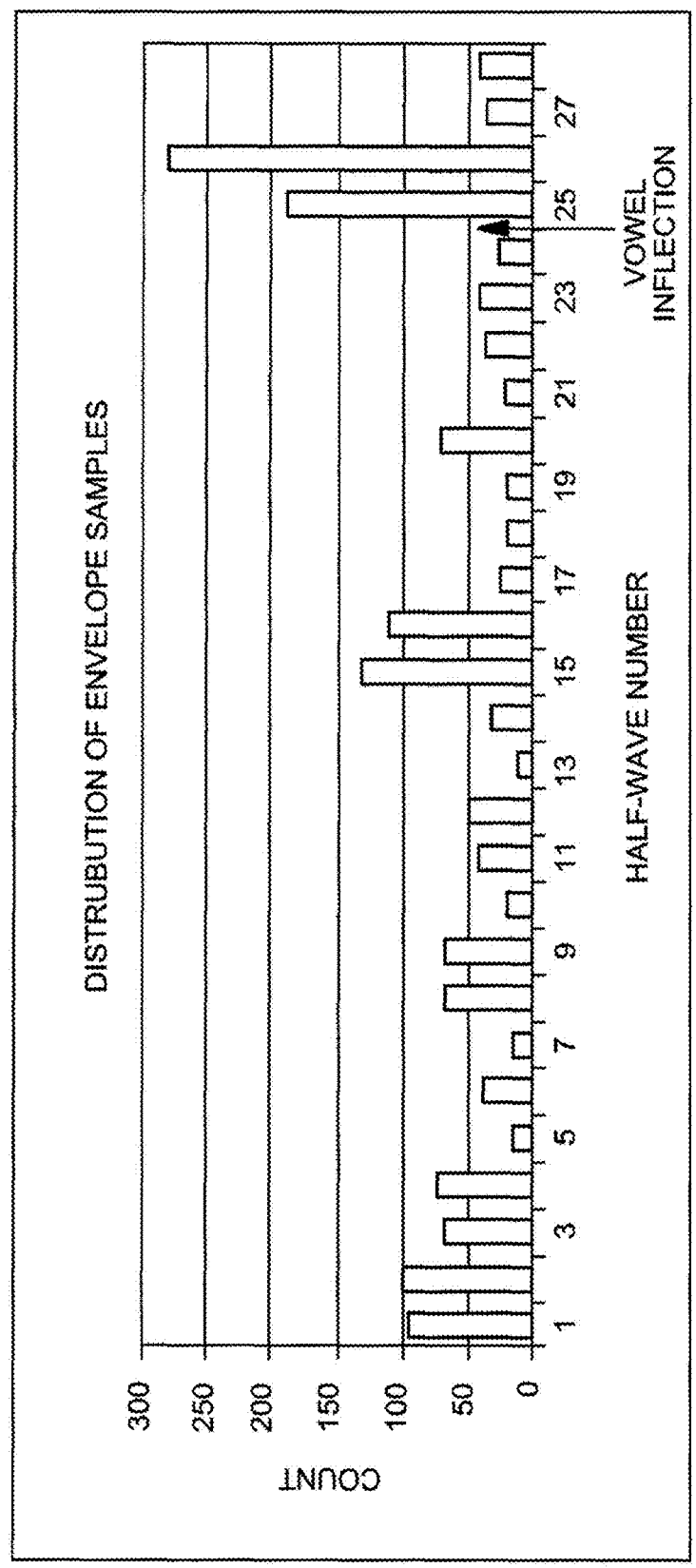
FIG. 4G depicts one example of a distribution of envelope samples used to identify a vowel.
Figure 4H:
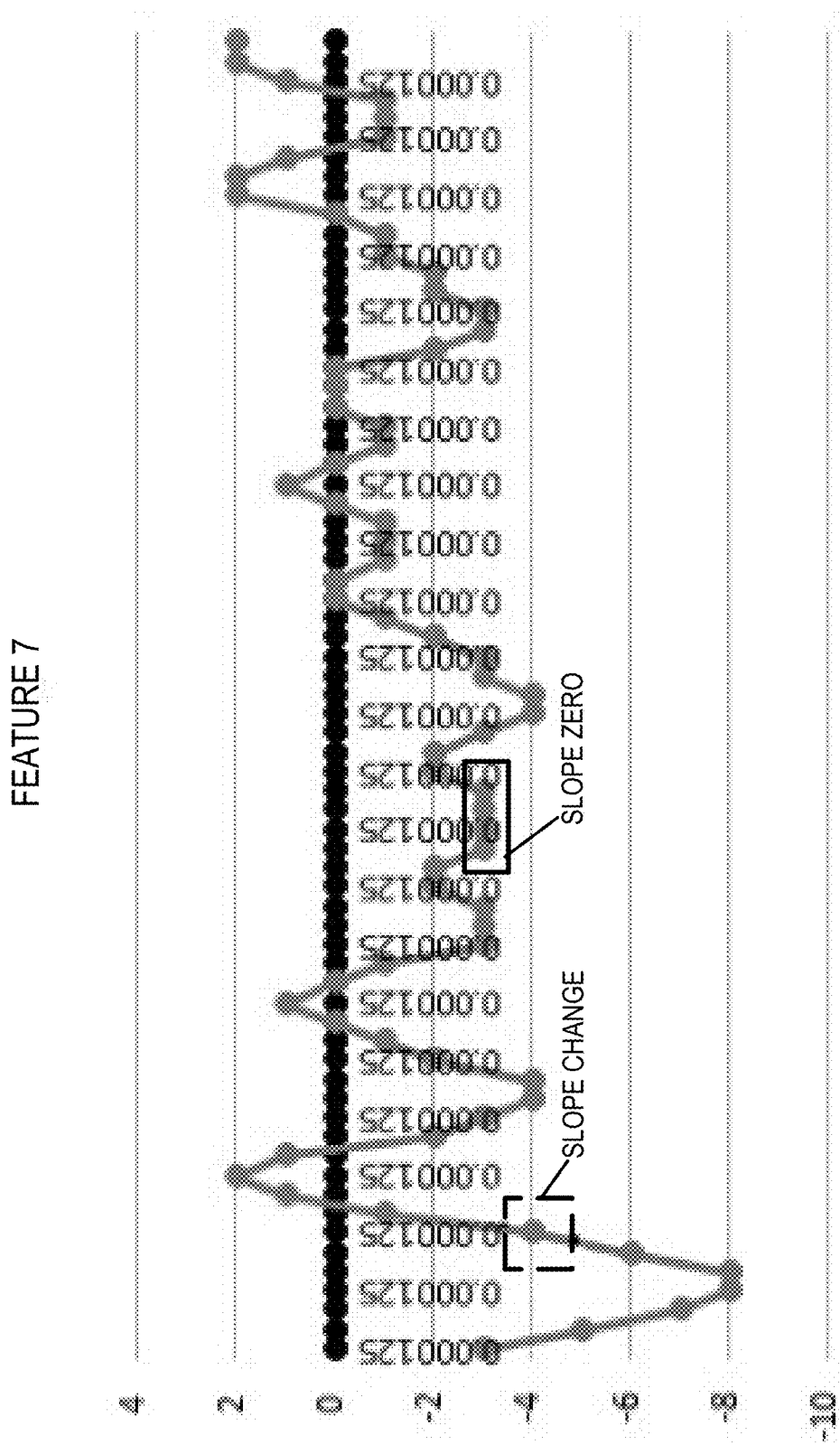

If the slope_change count is greater than the slope_zero count, INQUIRY 318 (FIG. 3B), and the slope_change occurs first in the soundlet INQUIRY 323, then the presence of F2 is established, STEP 320. One example of the characteristics of F2 is depicted in FIG. 4B. This feature appears on a half-wave (positive (crest) or negative (trough)), in which the sound envelope is not monotonic and has variations. In these variations, slope_change>slope_zero. Subsequent to establishing the presence of F2, processing continues at STEP 338, as described below. If the slope_change does not occur first in the soundlet INQUIRY 318, the presence of F7 is established, STEP 325, and processing continues at STEP 338. One example of the characteristics of F7 is depicted in FIG. 4H.

Returning to INQUIRY 318, should the slope_change count not be greater than the slope_zero count, then a further determination is made as to whether slope_zero is greater than zero and slope_change is equal to zero, INQUIRY 322. If so, then the presence of F3 is established, STEP 324. This is depicted in FIG. 4C. This feature appears on a half-wave (positive or negative), in which the sound envelope is not monotonic and has variations. In these variations, slope_zero>0 and slope_change=0. Processing then continues at STEP 338.

Referring to INQUIRY 322, if that test fails, then a further test is made as to whether slope_change is greater than zero and slope_zero is zero, INQUIRY 326. Should the slope_change be greater than zero and slope_zero be zero, then the presence of F4 is established, STEP 328. One example of this feature is depicted in FIG. 4D. This feature appears on a half-wave (positive or negative), in which the sound envelope is not monotonic and has variations. In these variations, slope_change>0 and slope_zero=0. Processing then continues at STEP 338.

Figure 4I:
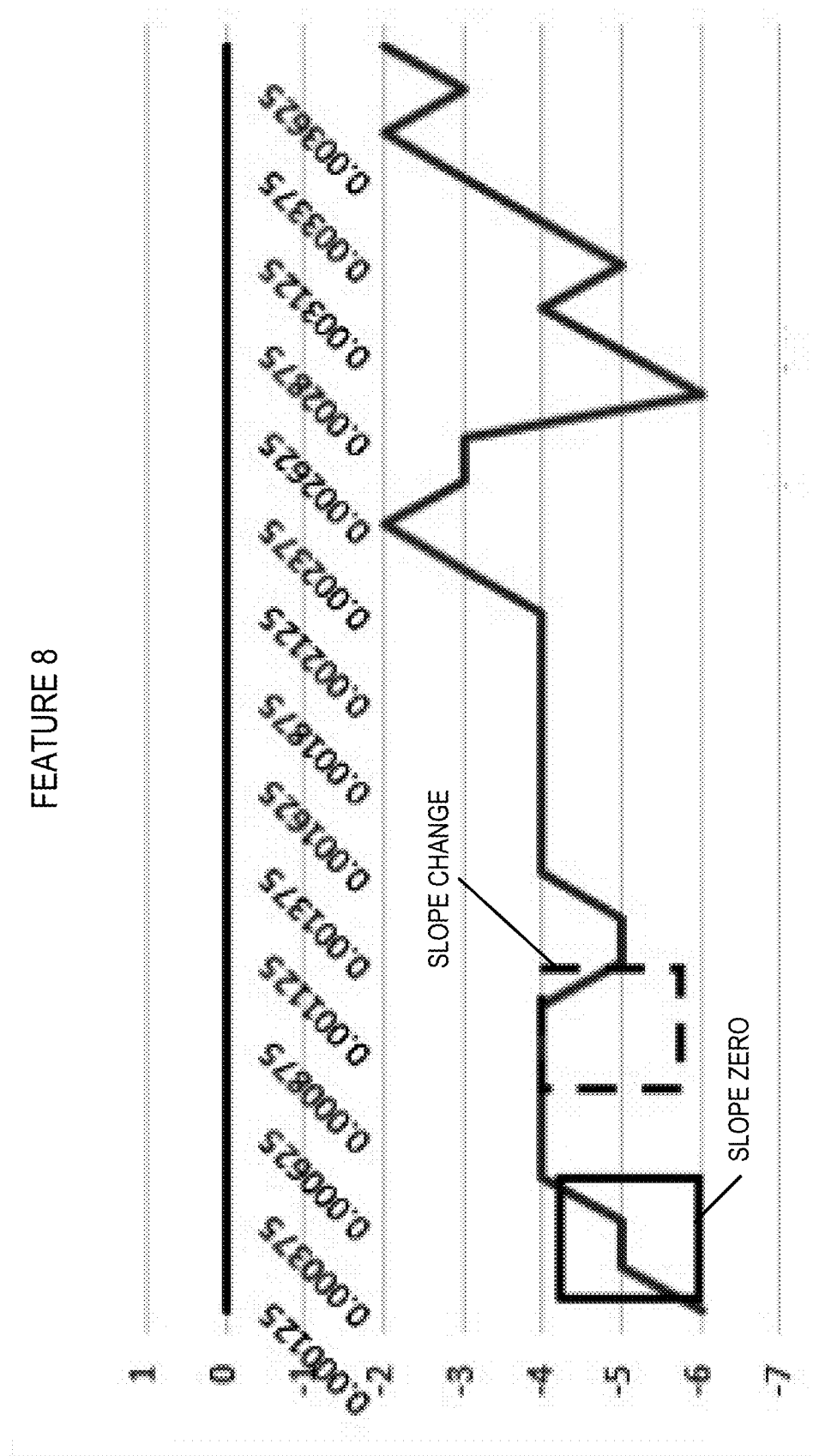

Returning to INQUIRY 326, if the test is negative, then a further determination is made as to whether slope_zero is greater than slope_change, INQUIRY 330. If slope_zero is greater than slope_change and the slope_zero occurs first in the soundlet, INQUIRY 327, then F5 is established, STEP 332, an example of which is depicted in FIG. 4E. This feature appears on a half-wave (positive or negative), in which the sound envelope is not monotonic and has variations. In these variations, slope_zero>slope_change. Processing then continues at STEP 338. If the slope_zero does not occur first in the soundlet, INQUIRY 327, the presence of F8 is established STEP 329, an example of which is depicted in FIG. 4I and processing continues at STEP 338.

If slope_zero is not greater than slope_change, INQUIRY 330, then a test is made to see whether slope_positive is greater than zero, INQUIRY 334. If slope_positive is greater than zero, then F6 is present, STEP 336. An example of F6 is depicted in FIG. 4F. This feature appears on a half-wave (positive or negative), in which the sound envelope is not monotonic and has variations. In these variations, slope_positive>0. Processing then continues at STEP 338. Processing also continues at STEP 338, should slope-positive be less than or equal to zero.

At STEP 338, for each feature F2 to F8, the number of points in the spread is measured (time slot count). This measures the duration of the feature, which helps define whether the feature is significant and whether the soundlet is a vowel or a consonant, as described below.

Figure 3C:
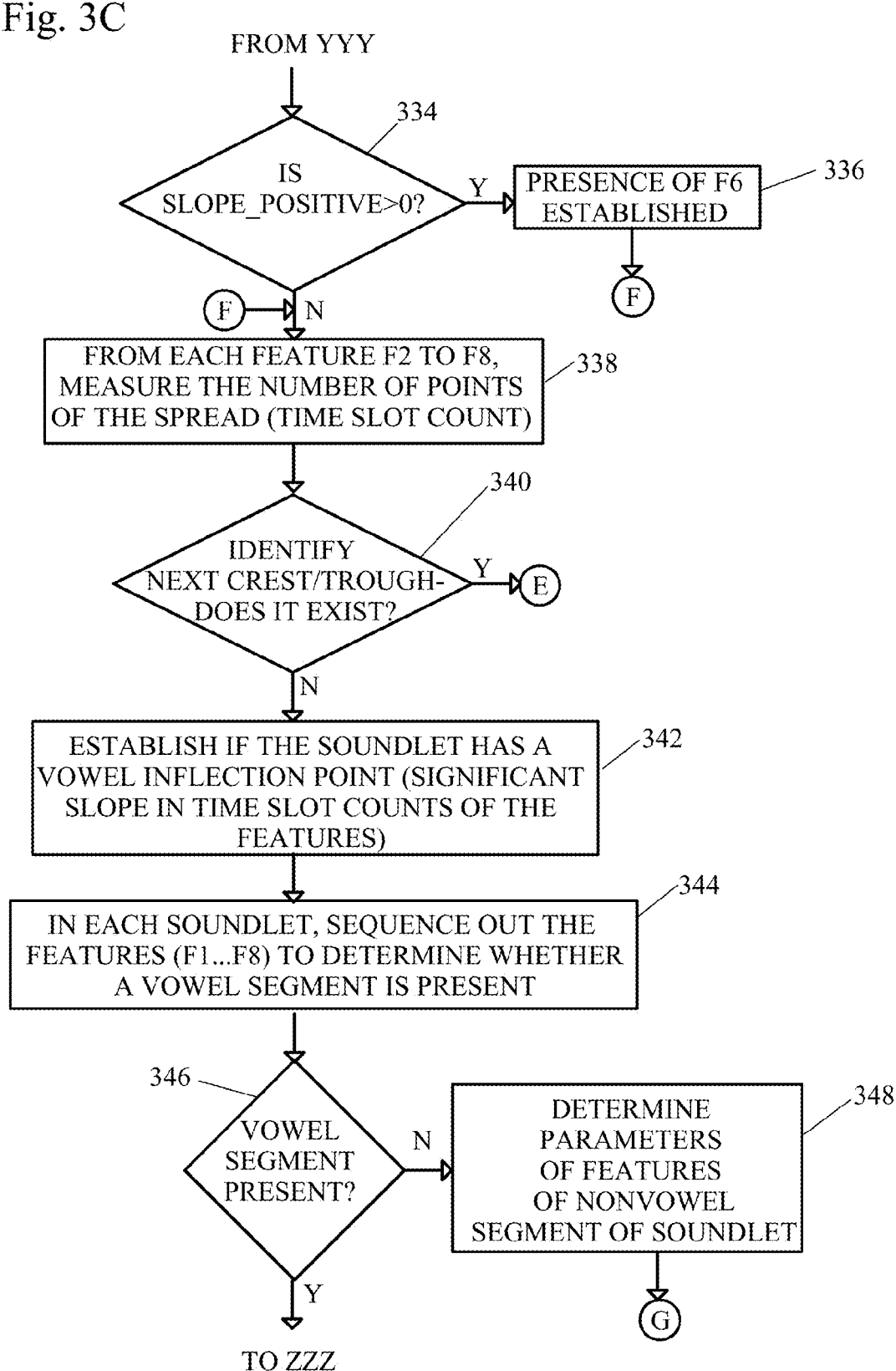
Figure 3D:
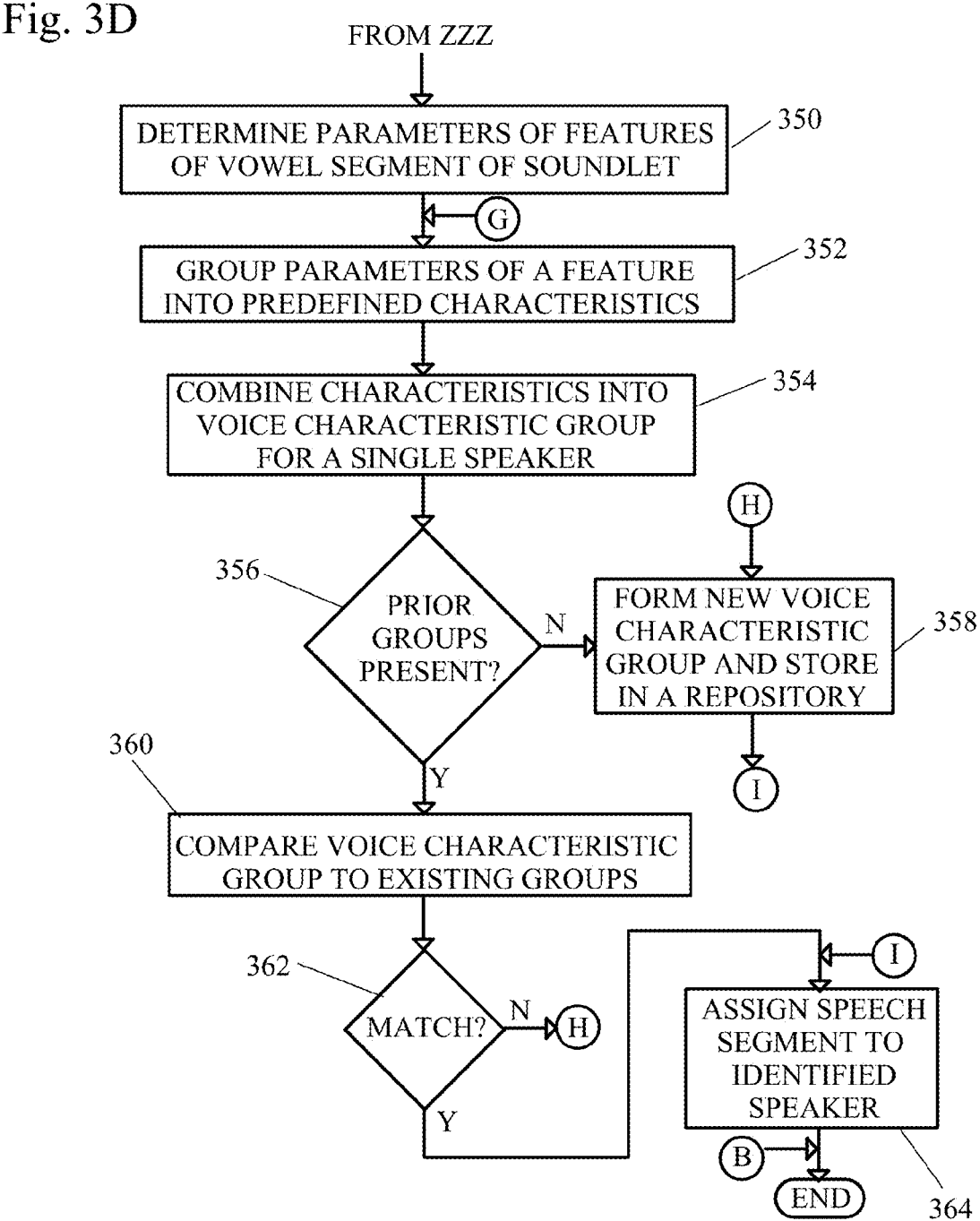

Thereafter, a determination is made as to whether another crest/trough exists, INQUIRY 340 (FIG. 3C). Should another crest/trough exist, processing continues at STEP 314 (FIG. 3A), as described above. Otherwise, if another crest/trough does not exist, processing continues with establishing if the soundlet has a vowel inflection point (e.g., a significant slope in time slot counts of the features), STEP 342. One example of a vowel inflection point is depicted in FIG. 4G. To differentiate a vowel within a soundlet, the duration of the waveform in the positive or negative zone over a set of cycles (at least 4) is measured. This will show a distribution pattern with a sharp differentiation (e.g., 2 or more crests or troughs with a longer duration), as shown in FIG. 4G. This assessment shows the separation point in the soundlet after which the envelope represents a vowel. For the different vowels, the same features (F2 . . . F8) being present are characteristics to identify the vowel. That is, a feature F2 . . . F8 is considered a vowel if that feature has an associated inflection point. It is indicated herein as F2(v) . . . F8(v).

Returning to FIG. 3C, subsequent to determining if there is at least one vowel in the soundlet, the features identified for the soundlet are sequenced out (i.e., placed in order of identification), STEP 344. In one example, this sequencing includes providing a sequence of the dominant features. That is, the time slot counts are used to determine which features are dominant. In one example, this determination is made by comparing the time slot counts of the features and eliminating those features that do not seem to have adequate numbers compared to the other features (in another example, other ways to select may be used or all features may be selected). The dominant features are then placed in order of identification.

If a determination is made that vowel segment, INQUIRY 346, is not present, parameters of features of the nonvowel segment are determined, STEP 348 and the method continues to STEP 352.

If a determination is made that vowel segment, INQUIRY 346, is present, parameters of features of the vowel segment are determined, STEP 350. The parameters characterize features (F1-F8) of a voice characteristic group.

The parameters of a feature are grouped into predefined characteristics, STEP 352, and the predefined characteristics are combined into a VCG for a single speaker, STEP 354.

If prior groups are not present, INQUIRY 356, a new voice characteristic group (VCG) is created and stored in a repository and the method continues to STEP 364.

If prior groups are present, INQUIRY 356, the VCG is compared to existing VCGs, STEP 360. If it is determined that a match is present, INQUIRY 362, a speech segment is assigned to an identified speaker, STEP 364, and the method ends.

If it is determined that a match is not present, INQUIRY 362, a new voice characteristic group (VCG) is stored in a repository and the method continues to STEP 364.

The predefined characteristics describe the soundlet. The soundlet may have only a few features of a vowel and/or a consonant. The defined characteristics are preferably a subset of the VCG. Thus, a soundlet's defined characteristic could be [{F2( ), F5( )}, { }] for a vowel or a [{F2( ), F7( )}, {F3( ), F8( )}] for a firm consonant. Each of the features have a set of parameters. The defined characteristics of the soundlet would be as an example—the slope change count, the slope zero count, the interspersing count and ratio of the slopes, and the range of variation of the sound wave in the soundlet. There are specific characteristics of a soundlet which are present for nearly all speakers, and as the speaker changes, the intensity of speaking (tone and volume) by different speakers would not change these characteristics in the soundlet, enabling a determination of the speaker. By using soundlet characteristics, the sound processing engine does not need identification of text prior to identifying the speaker and can assign the recorded soundlets to the different speakers, thus allowing parallel recognition in different units when conversations are recorded.

An example of a voice characteristic group includes the characteristics and computation for two consonants in the word "take" across three speakers (Person 1, Person 2, and Person 3). Person 1 and 2 are females and Person 3 is a male. Person 3 has two samples. Sc is the number of slope_changes, sz is the number of slope_zeros. Time samples of the three speakers are shown for computation of the two consonants in "take", with Table 1 showing the characteristics for the "k" from the utterance of the word "take" and Table 2 showing the characteristics for the "t" from the utterance of the word "take". Time samples of the three speakers are shown for the vowel sound "ae" of "take" in Table 3.

TABLE 1

| | | | K | | | |
|---|---|---|---|---|---|---|
| Feature | Characteristics | Range | Person 1 | Person 2 | Person 3_1 | Person 3_2 |
| F2 | sc, sz | | sc = 19 | sc = 278 | sc = 295 | sc = 288 |
| | | | sz = 106 | sz = 56 | sz = 93 | sz = 52 |
| | Range of | | sc: +2 to −5 | sc: +37 to −36 | sc: +62 to −55 | sc: +54 to −41 |
| | variation | | sz: −1 to +1 | sz: −24 to +6 | sz: −38 to +21 | sz: −12 to +21 |
| | Interspersing | | sc: 1-3 | sc: 1-62 | sc: 1-51 | sc: 1-73 |
| | | | sz: 0-23 | sz: 0-3 | sz: 0-6 | sz: 0-6 |
| | sc/sz ratio | <0.5 or >1.5 | 1.374214 | 0.240207 | 0.373182 | 0.461538 |
| | Range ratio | >2 | 3.5 | 2.366667 | 2.152542 | 2.818182 |

TABLE 2

| | | | T | | | |
|---|---|---|---|---|---|---|
| Feature | Characteristics | Range | Person 1 | Person 2 | Person 3_1 | Person 3_2 |
| F5 | sc, sz | | sc = 2 | sc = 7 | sc = 2 | sc = 1 |
| | | | sz = 7 | sz = 5 | sz = 4 | sz = 1 |
| | Range of | | sc: −2 to +1 | sc: −6 to +5 | sc: −1 to +2 | sc: 0 to +1 |
| | variation | | sz: −2 to +2 | sz: −3 to +3 | sz: −2 to 0 | sz: −2 to 0 |
| | Interspersing | | 1-3 | 0-2 | 0-2 | 0 |
| | sc/sz ratio | >0.5 or <1.5 | 0.285714 | 1.4 | 0.5 | 1 |
| | Range ratio | <2 | 0.75 | 1.833333 | 1.5 | 0.5 |

TABLE 3

| | | | ae | | | |
|---|---|---|---|---|---|---|
| Feature | Characteristics | Range | Person 1 | Person 2 | Person 3_1 | Person 3_2 |
| F2 | sc, sz | | sc = 144 | sc = 96 | sc = 135 | sc = 89 |
| | | | sz = 80 | sz = 76 | sz = 47 | sz = 33 |
| | Range of | | sc: +7 to −7 | sc: +12 to −21 | sc: +29 to −19 | sc: +25 to −27 |
| | variation | | sz: −3 to +3 | sz: −3 to +10 | sz: −16 to +8 | sz: −8 to +9 |
| | Interspersing | | sc: 1-10 | sc: 1-7 | sc: 1-7 | sc: 1-7 |
| | | | sz: 0-8 | sz: 0-18 | sz: 0-5 | sz: 0-4 |
| | sc/sz ratio | <0.5 or >1.5 | 1.44 | 3.789484 | 2.393617 | 1.79798 |
| | Range ratio | >2 | 2.333333 | 2.538462 | 2.0 | 2.8888889 |

Figure 7:
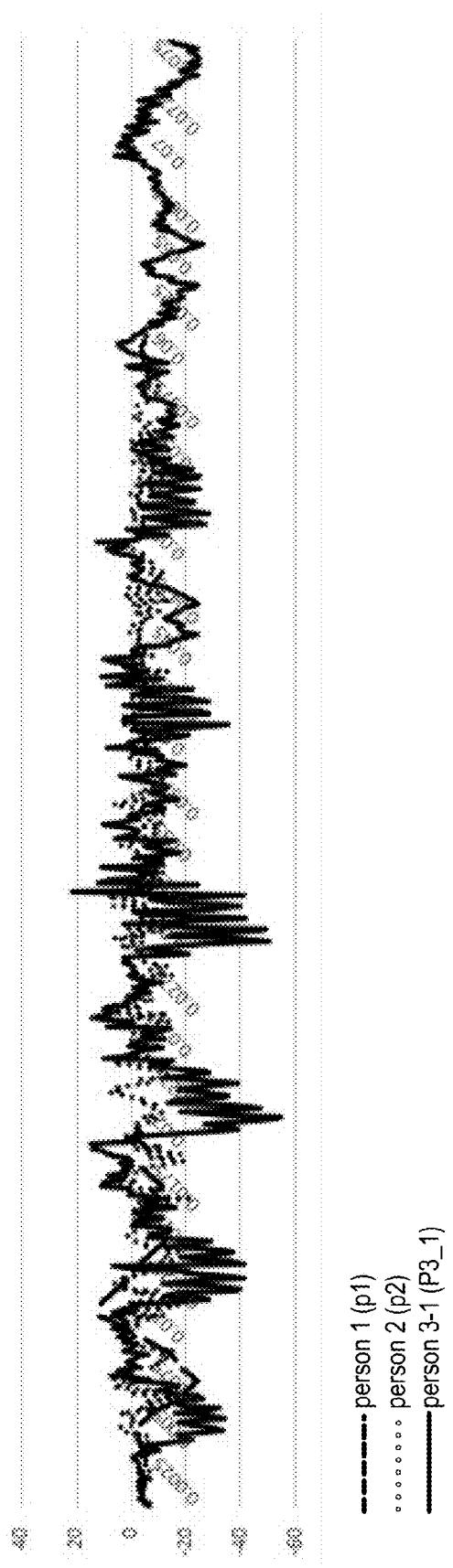
FIG. 7 shows a graph of a comparison of utterances by a first person, a second person and a third person for the word "take".

FIG. 5 shows a graph comparing single and multiple utterances of three people for the word "take". FIG. 6 shows a graph of comparison of utterances by a first person and a second person for the word "take". FIG. 7 shows a graph of a comparison of utterances by a first person, a second person and a third person for the word "take". It should be noted that the three people referred to in FIGS. 5-7 are the same people referred to in Tables 1-3 above.

FIGS. 5-7 show the variation of the speech contours across utterances by the same speaker and across speakers across genders. While the contours show a lot of differences in the range and time characteristics, the abstraction provided through the features and VCG show that there is commonality in the parameter value ranges for the same word uttered by a single speaker and differs well as a group of parameters across different speakers.

FIG. 8 illustrates internal and external components of device computer 52 and server computer 54 in which illustrative embodiments may be implemented. In FIG. 8, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, one or more operating systems 828 and one or more computer-readable tangible storage devices 830. The one or more operating systems 828, and soundlet program 66 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Accessibility path guidance program 66 can be stored on one or more of the portable computer-readable tangible storage devices 936, read via R/W drive or interface 832, and loaded into hard drive 830.

Each set of internal components 800a, 800b also includes a network adapter or interface 836 such as a TCP/IP adapter card. Soundlet program 66 can be downloaded to the device computer 52, and the server computer 54 from an external computer via a network (for example, the Internet, a local area network or other, wide area network) and network adapter or interface 836. From the network adapter or interface 836, soundlet program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The soundlet program 66 can be written in various programming languages including low-level, high-level, object-oriented or non object-oriented languages. Alternatively, the functions of a soundlet program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying at least one speaker from a speech segment obtained by a computer by determining one or more words of the speech segment by identifying one or more portions of a sound wave having a sound wave contour between silences, the method comprising the steps of:
   the computer analyzing the sound wave contour of at least a portion of the sound wave to determine one or more variations within the sound wave contour;
   the computer assigning one or more features to the one or more variations by selecting a feature from a plurality of features based on slope characteristics of the sound wave contour representing the one or more portions of the sound wave having the sound wave contour between silences;
   the computer mapping one or more assigned features to one or more sound constructs, wherein the one or more sound constructs are at least part of a word;
   the computer determining parameters of the assigned features and order in which the parameters occur within the sound wave contour to indicate the start of a vowel in the speech segment;
   the computer grouping the parameters into predefined characteristics;
   the computer combining the predefined characteristics into a voice characteristic group; and
   the computer comparing the voice characteristic group to a plurality of existing voice characteristic groups each of the plurality of voice characteristic groups being attributed to one of the plurality of single speakers and, if the predefined characteristics of the voice characteristic group match the predefined characteristics of one of the plurality of existing voice characteristic groups, the computer assigning the sound construct to a speaker identified by the existing voice characteristic group matching the voice characteristic group.

2. The method of claim 1, wherein if a prior voice characteristic group is not present, the computer forming a new voice characteristic group and storing the new voice characteristic group in a repository.

3. The method of claim 1, wherein the plurality of features comprises:
   feature 1 having a characteristic of the sound wave varying rapidly around the zero value in positive and negative half-waves;
   feature 2 having a characteristic of a slope_change count of the sound wave being greater than a slope_zero count in a half-wave;
   feature 3 having a characteristic of slope_zero count being greater than zero and slope_change count being equal to zero in a half-wave;
   feature 4 having a characteristic of slope_change count being greater than zero and slope_zero count being equal to zero in a half-wave;
   feature 5 having a characteristic of slope_zero count being greater than slope_change count in a half-wave;
   feature 6 having a characteristic of slope_positive count being greater than zero in a half-wave;
   feature 7 having a characteristic of a slope_change count of the sound wave being greater than a slope_zero count in a half-wave, wherein the slope_change count occurs prior to the slope_zero count in the half-wave; and
   feature 8 having a characteristic of slope_zero count being greater than slope_change count in a half-wave, wherein the slope_zero count occurs prior to the slope_change count in the half-wave.

4. The method of claim 1, wherein the step of the computer determining one or more words further comprises the steps of the computer identifying a specified period of silence to indicate termination of a word within the speech segment.

5. The method of claim 1, wherein the step of the computer mapping the one or more features of the sound construct further comprises the computer: sequencing out at least a portion of features of the one or more features to provide a feature sequence; and comparing the feature sequence to one or more defined sequences to identify one or more sound constructs of a selected language.

6. The method of claim 5, further comprising the computer forming a word by sequencing the sound constructs.

7. A computer program product for identifying at least one speaker from a speech segment obtained by a computer comprising the steps of determining one or more words of the speech segment by identifying one or more portions of a sound wave having a sound wave contour between silences, the computer comprising at least one processor, one or more memories, one or more computer readable storage media, the computer program product comprising a computer readable storage medium having program instructions embodied therewith, the program instructions executable by the computer to perform a method comprising:
   analyzing, by the computer, the sound wave contour of at least a portion of the sound wave to determine one or more variations within the sound wave contour;
   assigning, by the computer, one or more features to the one or more variations by selecting, by the computer, a feature from a plurality of features based on slope characteristics of the sound wave contour representing the one or more portions of a sound wave having a sound wave contour between silences;
   mapping, by the computer, one or more assigned features to one or more sound constructs, wherein the one or more sound constructs are at least part of word;
   determining, by the computer, parameters of the assigned features and order in which the parameters occur within the sound wave contour to indicate the start of a vowel in the speech segment;
   grouping, by the computer, the parameters into predefined characteristics;
   combining, by the computer, the predefined characteristics into a voice characteristic group; and
   comparing, by the computer, the voice characteristic group to a plurality of existing voice characteristic groups each of the plurality of voice characteristic groups being attributed to one of the plurality of single speakers and, if the predefined characteristics of the voice characteristic group match the predefined characteristics of one of the plurality of existing voice characteristic groups, by the computer, the sound construct to a speaker identified by the existing voice characteristic group matching the voice characteristic group.

8. The computer program product of claim 7, wherein if a prior voice characteristic group is not present, forming, by the computer, a new voice characteristic group and storing the new voice characteristic group in a repository.

9. The computer program product of claim 7, wherein the plurality of features comprises:
   feature 1 having a characteristic of the sound wave varying rapidly around the zero value in positive and negative half-waves;
   feature 2 having a characteristic of a slope_change count of the sound wave being greater than a slope_zero count in a half-wave;
   feature 3 having a characteristic of slope_zero count being greater than zero and slope_change count being equal to zero in a half-wave;
   feature 4 having a characteristic of slope_change count being greater than zero and slope_zero count being equal to zero in a half-wave;
   feature 5 having a characteristic of slope_zero count being greater than slope_change count in a half-wave;
   feature 6 having a characteristic of slope_positive count being greater than zero in a half-wave;
   feature 7 having a characteristic of a slope_change count of the sound wave being greater than a slope_zero count in a half-wave, wherein the slope_change count occurs prior to the slope_zero count in the half-wave; and
   feature 8 having a characteristic of slope_zero count being greater than slope_change count in a half-wave, wherein the slope_zero count occurs prior to the slope_change count in the half-wave.

10. The computer program product of claim 7, wherein the program instructions of mapping, by the computer, the one or more features of the sound construct further comprises: sequencing, by the computer, out at least a portion of features of the one or more features to provide a feature sequence; and comparing, by the computer, the feature sequence to one or more defined sequences to identify one or more sound constructs of a selected language.

11. The computer program product of claim 10, further comprising forming, by the computer, a word by sequencing the sound constructs.

12. A computer system for identifying at least one speaker from a speech segment obtained by a computer by determining one or more words of the speech segment are determined by the computer by identifying one or more words of the speech segment by identifying one or more portions of a sound wave having a sound wave contour between silences, the computer comprising at least one processor, one or more memories, one or more computer readable storage media having program instructions executable by the computer to perform the program instructions comprising:
   analyzing, by the computer, the sound wave contour of at least a portion of the sound wave to determine one or more variations within the sound wave contour;
   assigning, by the computer, one or more features to the one or more variations by selecting, by the computer, a feature from a plurality of features based on slope characteristics of the sound wave contour representing the one or more portions of a sound wave having a sound wave contour between silences;
   mapping, by the computer, one or more assigned features to one or more sound constructs, wherein the one or more sound constructs are at least part of word;
   determining, by the computer, parameters of the assigned features and order in which the parameters occur within the sound wave contour to indicate the start of a vowel in the speech segment;
   grouping, by the computer, the parameters into predefined characteristics;
   combining, by the computer, the predefined characteristics into a voice characteristic group; and
   comparing, by the computer, the voice characteristic group to a plurality of existing voice characteristic groups each of the plurality of voice characteristic groups being attributed to one of the plurality of single speakers and, if the predefined characteristics of the voice characteristic group match the predefined characteristics of one of the plurality of existing voice characteristic groups, by the computer, the sound construct to a speaker identified by the existing voice characteristic group matching the voice characteristic group.

13. The computer system of claim 12, wherein if a prior voice characteristic group is not present, forming, by the computer, a new voice characteristic group and storing the new voice characteristic group in a repository.

14. The computer system of claim 12, wherein the plurality of features comprises:
   feature 1 having a characteristic of the sound wave varying rapidly around the zero value in positive and negative half-waves;
   feature 2 having a characteristic of a slope_change count of the sound wave being greater than a slope_zero count in a half-wave;
   feature 3 having a characteristic of slope_zero count being greater than zero and slope_change count being equal to zero in a half-wave;
   feature 4 having a characteristic of slope_change count being greater than zero and slope_zero count being equal to zero in a half-wave;
   feature 5 having a characteristic of slope_zero count being greater than slope_change count in a half-wave;
   feature 6 having a characteristic of slope_positive count being greater than zero in a half-wave;
   feature 7 having a characteristic of a slope_change count of the sound wave being greater than a slope_zero count in a half-wave, wherein the slope_change count occurs prior to the slope_zero count in the half-wave; and
   feature 8 having a characteristic of slope_zero count being greater than slope_change count in a half-wave, wherein the slope_zero count occurs prior to the slope_change count in the half-wave.

15. The computer system of claim 12, wherein the program instructions of determining, by the computer one or more words further comprises identifying, by the computer, a specified period of silence to indicate termination of a word within the speech segment.

16. The computer system of claim 12, wherein the program instructions of mapping, by the computer, the one or more features of the sound construct further comprises: sequencing, by the computer, out at least a portion of features of the one or more features to provide a feature sequence; and comparing, by the computer, the feature sequence to one or more defined sequences to identify one or more sound constructs of a selected language.

17. The computer system of claim 16, further comprising forming, by the computer, a word by sequencing the sound constructs.

\* \* \* \* \*